United States Patent [19]
Fischer

[11] Patent Number: 5,669,677
[45] Date of Patent: Sep. 23, 1997

[54] ABS AND/OR ASC CONTROL SYSTEM FOR MOTOR VEHICLES

[75] Inventor: Gerhard Fischer, München, Germany

[73] Assignee: Bayerische Motoren Werke Aktiengesellschaft, Germany

[21] Appl. No.: 618,841

[22] Filed: Mar. 20, 1996

[30] Foreign Application Priority Data

Mar. 20, 1995 [DE] Germany ............ 195 10 104.9

[51] Int. Cl.⁶ .............................. B60T 8/32; B60K 28/16
[52] U.S. Cl. ............... 303/147; 188/181 C; 303/169
[58] Field of Search ............................ 303/146, 147, 303/140, 169, 20, 191, 177, 145; 364/426.01, 426.02, 426.03; 188/181 C

[56] References Cited

U.S. PATENT DOCUMENTS

| | | |
|---|---|---|
| 4,933,856 | 6/1990 | Leiber ............................ 303/140 |
| 5,150,951 | 9/1992 | Leiber et al. . |
| 5,219,212 | 6/1993 | Shimada et al. . |
| 5,341,297 | 8/1994 | Zomotor et al. . |
| 5,474,368 | 12/1995 | Sano . |
| 5,476,310 | 12/1995 | Ohtsu et al. . |

FOREIGN PATENT DOCUMENTS

| | | |
|---|---|---|
| 39 19 347 | 2/1990 | Germany . |
| 41 11 614 | 10/1992 | Germany . |
| 41 40 239 | 6/1993 | Germany . |

OTHER PUBLICATIONS

"Bremsanlage und Schlupf–Regelsysteme der neuen 7er–Reihe von DMW," Leffler et al, ATZ Automobiltechnische Zeitschrift 97, Jan. 1995, pp. 8–19.

Primary Examiner—Douglas C. Butler
Attorney, Agent, or Firm—Evenson, McKeown, Edwards & Lenahan P.L.L.C.

[57] ABSTRACT

The invention provides an ABS and/or ASC control system for motor vehicles, of the type having a sensor arrangement for detecting rotational wheel speeds, an analysis unit for the cornering recognition, and actuators for reducing the brake pressure on at least one wheel which is on the inside during the cornering in the case of a cornering recognition and an operated brake such that an ABS control is initiated on at the most one wheel. Cornering recognition is carried out by calculating an actual value proportional to the rear axle lateral acceleration from the difference of the rotational wheel speeds of the rear wheels and/or an actual value proportional to the front axle lateral acceleration from the difference of the rotational speeds of the front wheels. A reduction of brake pressure on at least on one inside wheel is cancelled if otherwise, because of a braking force increased by the driver on the inside front wheel, the ABS control would be switched on or the deceleration of the inside rear wheel exceeds a given threshold.

11 Claims, 2 Drawing Sheets

ABS AND/OR ASC CONTROL SYSTEM FOR MOTOR VEHICLES

BACKGROUND AND SUMMARY OF THE INVENTION

This invention relates to an ABS and/or ASC control system for motor vehicles.

This type of a control system for motor vehicles is known, for example, from the ATZ article "Brake System and Wheel Slip Control Systems of the New 7-Series BMW's:, January 1995, Page 15, and on. This known control system has a sensor arrangement for detecting the rotational speeds of the four wheels of a motor vehicle. These signals are used to recognize a locking tendency of the vehicle wheels during intensive braking maneuvers, which is then prevented by a conventional ABS control. In the case of the system which is expanded under the term "Special ABS", in addition to the customary ABS control, an additional wheel-selective influencing of the brake pressure is possible. When, during cornering, the driver initiates a slight braking, a pulsed pressure buildup or a reduction of the braking pressure on the front and rear wheel which is on the inside during the cornering is performed by the actuators of an existing ABS/ASC control system. A slight braking is a brake operation which has the effect that an ABS control is initiated on one wheel at the most.

In the case of this known system, cornering is recognized by reference to a specific lateral acceleration threshold, which is realistically determined from the driving speed and the signal of a steering angle sensor. Although, this known control system is capable of distinguishing between secure and unstable cornering, the use of a steering angle sensor for this purpose requires high expenditures and cost. Furthermore, when the brake pressure is reduced, the known system takes into account only the cornering recognition but not parameters which, in turn, may lead to other instabilities of the vehicle.

It is an object of the present invention to provide an improved control system of the initially mentioned type, in which the conditions for reducing the brake pressure on at least one wheel which is on the inside during the cornering are adapted to different driving conditions.

Another object of the invention is to provide such an improved control system in which additional cost-intensive sensor arrangements are not required.

These and other objects and advantages are achieved by the control system according to the invention, in which cornering is recognized by the calculation of a first actual value proportional to the rear-axle lateral acceleration, based on the difference of the rotational wheel speeds of the rear wheels, and/or calculation of a second actual value which is proportional to the front-axle lateral acceleration, based on the difference of the rotational wheel speeds of the front wheels.

In this manner, cornering can be detected without need of additional sensor arrangements, such as steering angle sensors or lateral acceleration sensors; rather the control system according to the invention utilizes in a multi-functional manner only already existing rotational wheel speed sensors. Although a cornering recognition based on the difference of rotational wheel speeds of an axle is less precise than cornering recognition by means of additional curve-related parameters (such as steering angle information), during a calculation preferably of the actual values which are proportional to the lateral acceleration of the rear axle as well as of the front axle, a redundancy exists during the determination of the cornering recognition; thus there is a correction possibility. In addition, it should be pointed out that the term "cornering recognition" applies not only to the extent but, for example, also to be type (right-hand cornering, left-hand cornering) of a curve.

In one embodiment of the invention, the reduction of the brake pressure is cancelled on at least one inside wheel during the cornering if, otherwise, because of an increase of braking force by the driver, the ABS control would be switched on at the front wheel.

This measure according to the invention takes into account, in particular, a driving situation in which, for example, the driver again specifies an increase of the braking force during a cornering. If, in this situation, a reduction of the brake pressure were maintained, it could, in an extreme case, cause a turning of the motor vehicle against the cornering direction. This is prevented by the measure according to the invention.

According to another feature of the invention, the reduction of the brake pressure is cancelled again at least on one inside wheel when the deceleration of the rear wheel which is on the inside exceeds a given threshold, thus achieving the same effect as the previous embodiment. However, in this case, the application of an increased braking force is determined by the driver by means of the determined deceleration of the inside rear wheel. The deceleration of the inside rear wheel can be determined particularly easily by calculating the derivative of the rotational wheel speeds, or by wheel speeds determined anyhow.

Yet another embodiment of the invention takes into account the different behavior of the calculated actual values which are proportional to the lateral acceleration of the front and rear axles, particularly at the beginning of cornering. If, for example, at the beginning of cornering, the brake is not yet operated, the course of the first actual value proportional to the rear axle lateral acceleration is normally steeper than the course of the second actual value proportional to the front-axle lateral acceleration. In this case, for the cornering recognition before operating the brake, for example, the first threshold values is higher than the second threshold value.

Still another embodiment of the invention takes into account the situation in which, at the beginning of brake operation, no cornering recognition has taken place yet. In this case, it may also be taken into account that cornering which commences after the operation of the brake generally causes similar courses of the actual values proportional to the rear axle and front axle lateral acceleration. Thus, the third and the fourth threshold value, for example, may be identical.

Another object of the invention relates to a condition for cancelling the reduction of the brake pressure when cornering ends. This object is based on the proposition that particularly the course of the actual value proportional to the front axle lateral acceleration reflects the real cornering course particularly accurately. Thus, the end of a cornering is recognized when the actual value proportional to the front axle lateral acceleration has fallen below a given threshold (fifth threshold value), without reference to the actual value proportional to the rear axle lateral acceleration. In this manner, the reduction of the brake pressure at least on a wheel on the inside of the cornering is prevented from continuing too long, thereby preventing the instability which might other wise occur, for example, if instead of the turning-in, the motor vehicle, turns out.

According to another feature of the invention, a measure is taken by means of which the effect of the reduction of the brake pressure is cancelled as fast as possible at least on one wheel on the inside during a cornering, upon the occurrence of a predetermined condition.

Preferably the reduction of the brake pressure is implemented abruptly, but with a time-delay, and is switched off again as comfortably as possible.

Other objects, advantages and novel features of the present invention will become apparent from the following detailed description of the invention when considered in conjunction with the accompanying drawings.

DETAILED DESCRIPTION OF THE DRAWINGS

Figure 1:
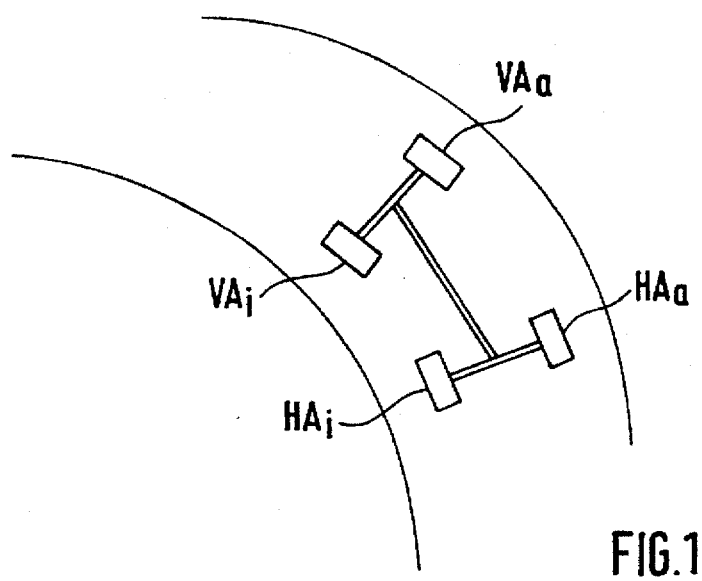
FIG. 1 is a schematic representation of a vehicle during a cornering, indicating the wheels on the inside and on the outside during the cornering.

FIG. 1 is a schematic representation of a motor vehicle which carries out a cornering to the left, so that the left front wheel $VA_i$ is on the inside during the cornering. (Correspondingly, in the case of a right cornering, the right front wheel is on the inside during the cornering.) In the illustrated example of a left cornering, the left rear wheel $HA_i$ is on the inside during the cornering. The right front wheel $VA_a$ and the right rear wheel $HA_a$, on the other hand, are on the outside.

Figure 2:
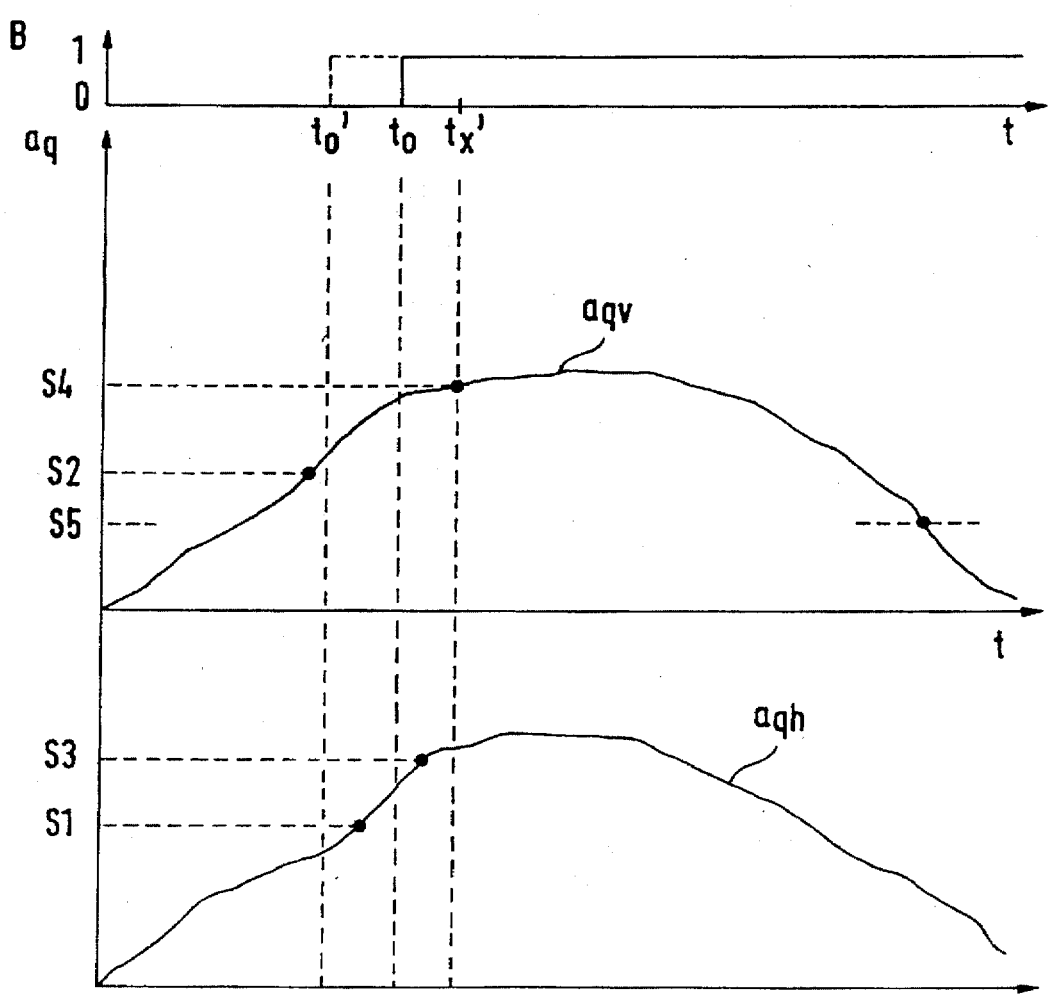
FIG. 2 is a view of a first cornering recognition according to the invention before actuation of a brake, and a second cornering recognition after the operating of the brake.

In the upper graph, FIG. 2 shows the operation of the brake based, for example, on the operation of the brake light switch B. The two lower waveforms in FIG. 2 show the actual values proportional to the lateral acceleration of the front and rear axles, $a_{qv}$ and $a_{qh}$ respectively, as a function of time t.

Depending on the circumstances, the invention takes the following measures:

First, a first case will be considered in which braking is initiated at the point in time $t_0$, as shown in FIG. 2. Brake operation is recognized in that the signal of the brake light switch B changes from "0", (a switched-off brake light switch) to "1" (a switched-on brake light switch). At time $t_0$, the actual value $a_{qh}$ proportional to the front axle lateral acceleration exceeds the first threshold value s1, and the actual value $a_{qv}$ proportional to the front axle lateral acceleration exceeds the second threshold value S2. Thus, at time $t_0$ (that is, upon initiation of brake operation), a reduction of the brake pressure is implemented by the actuators which are already present on the vehicle for wheel-selective influencing of the brake, at least on the inside rear wheel $HA_i$. Preferably the brake pressure predetermined by the intensity of the brake actuation is applied only to the other three wheels $VA_i$, $VA_a$ and $HA_a$. This reduction of the brake pressure is maintained in the illustrated example in FIG. 2 until the actual value $a_{qv}$ falls below the lower threshold value S5, at which time the brake pressure in the rear wheel $HA_i$ is (preferably slowly) adapted to the brake pressure of the rear wheel $HA_a$ on the outside.

If, after the point in time $t_0$ and before the actual value $a_{qv}$ falls below the threshold value S5, the braking force were increased so that either a locking tendency of the inside front wheel $VA_i$ is recognized (based on activation of the ABS control) and/or the deceleration of the inside rear wheel $HA_i$ would exceed a predetermined threshold, the reduction of the brake pressure in the rear wheel $HA_i$, would be cancelled before $a_{qv}$ falls below the S5 threshold value. Preferably, at the same time when the pressure in the rear wheel $HA_i$ is thus built up, the brake pressure on the inside front wheel $VA_a$ and/or in the outside rear wheel $HA_a$, is reduced for a short time (which may be predetermined). As a result, the effect of the reduction of the brake pressure at least on the inside rear wheel $HA_i$, is eliminated as fast as possible, but in a comfortable manner.

In a second case, braking commences at time $t_o'$, before at least one of the two actual values $a_{qh}$ and $a_{qv}$ exceeds its associated threshold values S1 and S2. (In the illustration $a_{qh}$ remains below the threshold value S1.) This driving condition occurs particularly when a driver operates the brakes shortly before cornering or immediately at the start of cornering. In this case, no cornering recognition takes place at time $t_0'$ and therefore no reduction of the brake pressure is implemented.

Preferably, a low-pass filter is used in the second case to determine the actual value $a_{qv}$. If low-pass filters are used for both $a_{qv}$ and $a_{qh}$, at least the response time of the low-pass filter for the actual value $a_{qh}$ must be much shorter than the response time of the low-pass filter for the actual value $a_{qv}$.

In this second case, new threshold values are established for the cornering recognition—S3 for the actual value $a_{qh}$ and S4 for the actual value a—which are greater than the thresholds S1 and S2 respectively. However, the threshold values S3 and S4 may, for example, be identical.

At the point in time $t_x'$, both the actual value $a_{qh}$ and the actual value $a_{qv}$ have exceeded the respective third and fourth threshold values S3 and S4. Cornering is therefore recognized and the brake pressure is accordingly reduced on at least one inside wheel $VA_i$ and/or $HA_i$ in this second case, no earlier than time $t_x'$. The reduction of the brake pressure can subsequently be cancelled in the same manner as described above.

Possible further advantageous embodiments of the invention relate to other conditions for reducing the brake pressure on the inside rear wheel $HA_i$, and/or on the inside front wheel $VA_i$. Thus a reduction of the brake pressure takes place only on one wheel which is on the inside during the cornering, preferably the rear wheel $HA_i$. A reduction of the brake pressure on the inside front wheel $VA_i$, is carried out only in the sense of an ABS control when the slip is lower than in the normal case of an ABS control. For example, the lower slip is defined by a reduced control threshold relative to the difference of the vehicle speed and the wheel speed of the front wheel $_{VA}i$ which is on the inside during the cornering.

Furthermore, starting criteria for switching on the ABS/ASC control system according to the invention may be given, such as the exceeding of a predetermined vehicle speed threshold (for example, 40 km/h) and/or the falling-below a threshold (for example, S1, S2, S3 or S4) by the actual value proportional to the front axle or rear axle lateral acceleration for a given time (for example, 10 s).

A reasonableness monitoring may also be carried out for recognizing defects. A defect is recognized, for example, when above a given vehicle speed (for example, 40 km/h), the actual value proportional to the front axle or rear axle lateral acceleration exceeds a given upper threshold (for example, S1, S2, S3 or S4) for a given time (for example, 20 s).

Figure 3:
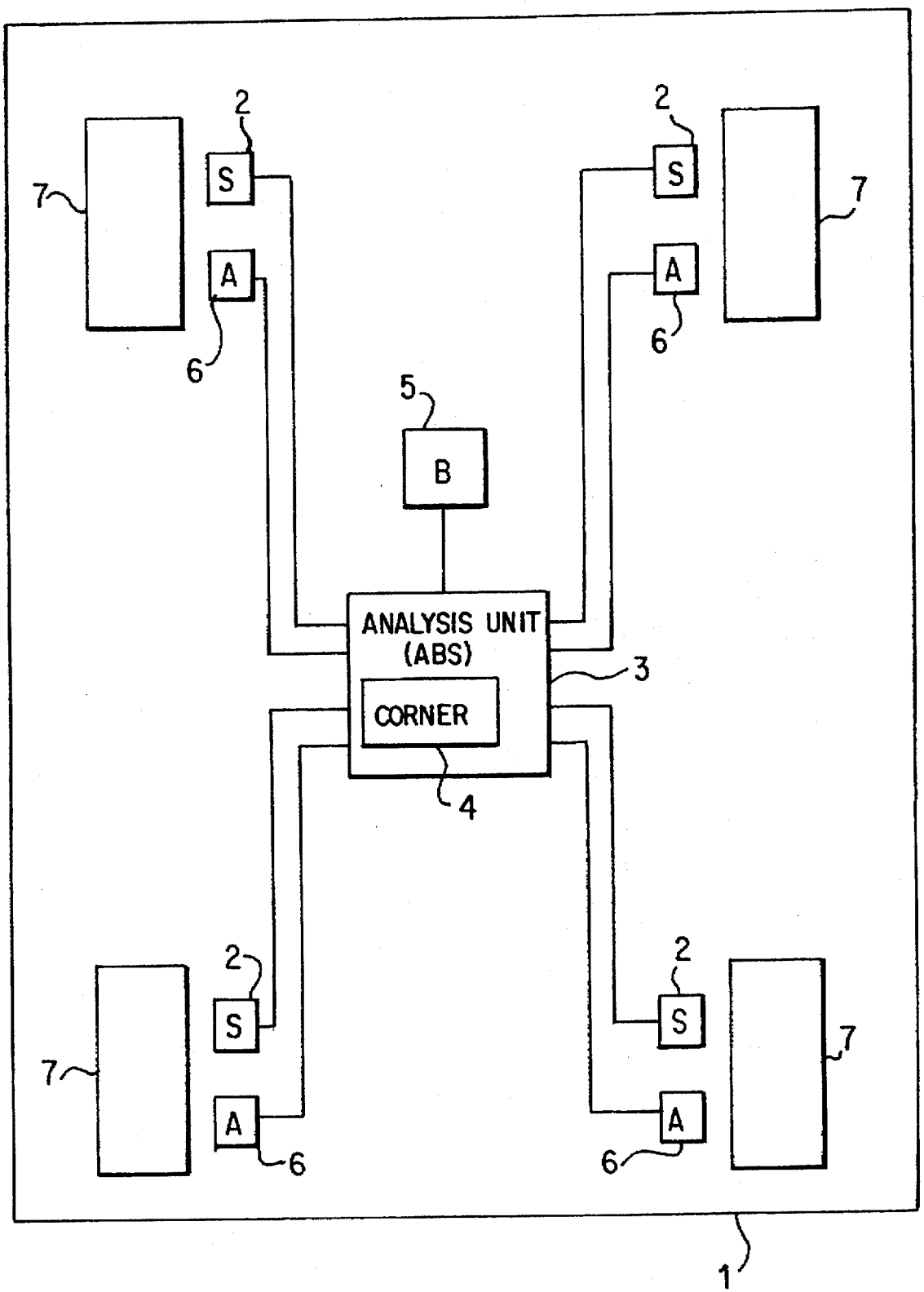
FIG. 3 is a schematic diagram of a braking control apparatus according to the invention.

FIG. 3 is a schematic diagram which shows an arrangement according to the invention for controlling braking operation in an automobile 1 having an ABS unit. As noted previously, wheel speed of the wheels 7 is detected by the sensor units 2, and this information is provided to an analysis unit 3 which is conventionally provided in an ABS system, and includes a cornering recognition unit 4. The sensors 2, as well as brake operation information from the brake unit 5, and controls the actuators 6 which regulate the amount of braking pressure applied to the respective wheels 7, in the manner described previously.

By means of these embodiments according to the invention, an optimal driving-condition-adapted increase of stability can be achieved at reasonable cost.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A braking control system for motor vehicles, of the type having a sensor arrangement for detecting rotational wheel speeds, an analysis unit for cornering recognition, and actuators for reducing brake pressure on at least one wheel which is on an inside of said vehicle during a cornering in the case of a cornering recognition and an operated brake, such that an ABS control is initiated on at the most one wheel, wherein:

said analysis unit comprises means for recognizing cornering by calculating at least one of a first actual value proportional to rear axle lateral acceleration from a difference of rotational wheel speeds of rear wheels of the vehicle and a second actual value proportional to front axle lateral acceleration from a difference of the rotational wheel speeds of the front wheels.

2. A braking control system according to claim 1, wherein said analysis unit recognizes a cornering when the first actual value exceeds a given first threshold value and the second actual value exceeds a given second threshold value.

3. A braking control system according to claim 1, wherein said analysis unit recognizes a cornering when the first actual value exceeds a third threshold value which is higher than the first threshold value, and the second actual value exceeds a fourth threshold value which is higher than the second threshold value if, at a point in time when braking commences, no cornering recognition has taken place yet.

4. A braking control system according to claim 1, wherein a reduction of the brake pressure on at least one wheel which is on the inside during cornering is canceled when the second actual value proportional to the front axle lateral acceleration falls below a fifth threshold value.

5. A braking control system according to claim 1, wherein a reduction of brake pressure on at least on one wheel is cancelled if, because of a braking force increased by a driver of said vehicle, on the front wheel which is on the inside during the cornering, an automatic braking system control of said vehicle would be switched on.

6. A braking control system according to claim 1 wherein a reduction of the brake pressure on at least on one wheel which is on the inside of the vehicle during the cornering is cancelled when deceleration of the rear wheel which is on the inside during the cornering exceeds a given threshold.

7. A braking control system according to claim 6, wherein for a predetermined time, a reduction of brake pressure is carried out on at least one of the front wheel which is on the outside during the cornering, and in the rear wheel which is on the outside during the cornering, while the reduction of the brake pressure on at least one wheel which is on the inside during the cornering is cancelled again.

8. A braking control system for a motor vehicle, comprising:

a sensor arrangement for measuring rotational wheel speeds of said vehicle;

an analysis unit comprising means for calculating at least one of a first actual value proportional to rear axle lateral acceleration from a difference of rotational rear wheel speeds of the vehicle, and a second actual value proportional to front axle lateral acceleration from a difference of the rotational front wheel speeds of the vehicle, and for recognizing a cornering of said vehicle based on at least one of said first and second actual values; and actuators responsive to an output from said analysis unit for reducing brake pressure on at least one wheel is on an inside of said vehicle upon operation of vehicle brakes during a cornering of said vehicle.

9. Method of operating a vehicle braking system of the type having sensors for determining rotational speeds of wheels of said vehicle and means for modifying application of brake pressure to at least one wheel of said vehicle:

measuring rotational wheel speeds of left and right front and left and right rear wheels of said vehicle;

determining a first difference value of wheel speeds measured for said left and right front wheels, and a second difference value of wheel speeds measured for said left and right rear wheels; and comparing said first and second differences to respective predetermined threshold values;

recognizing a cornering of said vehicle based on said comparison of at least one of said first and second difference values; and detecting operation of a vehicle braking system by a vehicle operator;

modifying application of brake pressure to at least one wheel of said vehicle in response to recognition of said cornering.

10. A braking control system for motor vehicles, of the type having a sensor arrangement for detecting rotational wheel speeds, an analysis unit for cornering recognition, and actuators for reducing brake pressure on at least one wheel which is on an inside of said vehicle during a cornering in the case of a cornering recognition and an operated brake, such that an ABS control is initiated on at the most one wheel, wherein:

a reduction of brake pressure on at least on one wheel is cancelled if, because of a braking force increased by a driver of said vehicle, on the front wheel which is on the inside during the cornering, an automatic braking system control of said vehicle would be switched on.

11. A braking control system for motor vehicles, of the type having a sensor arrangement for detecting rotational wheel speeds, an analysis unit for cornering recognition, and actuators for reducing brake pressure on at least one wheel which is on an inside of said vehicle during a cornering in the case of a cornering recognition and an operated brake, such that an ABS control is initiated on at the most one wheel, wherein:

a reduction of the brake pressure on at least on one wheel which is on the inside of the vehicle during the cornering is cancelled when deceleration of the rear wheel which is on the inside during the cornering exceeds a given threshold.

* * * * *